(12) United States Patent
Bennett

(10) Patent No.: US 6,868,796 B2
(45) Date of Patent: Mar. 22, 2005

(54) TURF CULTIVATOR

(76) Inventor: Frank W. Bennett, 67 Rocky Ridge Rd., Arden, NC (US) 28704

( * ) Notice: Subject to any disclaimer, the term of this patent is extended or adjusted under 35 U.S.C. 154(b) by 0 days.

(21) Appl. No.: 10/706,808

(22) Filed: Nov. 12, 2003

(65) Prior Publication Data
US 2004/0149468 A1 Aug. 5, 2004

Related U.S. Application Data

(60) Provisional application No. 60/425,789, filed on Nov. 12, 2002.

(51) Int. Cl.$^7$ .............................................. A01C 23/00
(52) U.S. Cl. ........................................................ 111/121
(58) Field of Search ......................... 111/118, 121–132, 111/161–167, 54, 57, 60; 172/151, 180, 184, 196, 629, 633, 657

(56) References Cited

U.S. PATENT DOCUMENTS

| | | | |
|---|---|---|---|
| 2,262,546 A | | 11/1941 | Donoho et al. ................. 111/1 |
| 4,426,940 A | * | 1/1984 | Brain et al. ................. 111/123 |
| 6,505,568 B1 | * | 1/2003 | Miers ......................... 111/121 |

* cited by examiner

Primary Examiner—Robert E Pezzuto
(74) Attorney, Agent, or Firm—Joseph T. Guy; Nexsen Pruet, LLC

(57) ABSTRACT

A frame, with attached blade, for distributing fertilizer under soil surface.

11 Claims, 3 Drawing Sheets

TURF CULTIVATOR

CROSS-REFERENCE TO RELATED APPLICATIONS

This application claims benefit of 60/425,789 filed Nov. 12, 2002 which is expired.

The maintenance of golf greens has long been faced with the problems of cultivating the turf of a green without impairment of the playing surface. In recent years, this problem has become more acute because of the rapidly increasing popularity of the game of golf and the high cost of maintenance and renovation. These factors make it imperative that the golf course is functioning as a whole at all times. A course that is down for repairs is a great expense to the owners and a big inconvenience to the customer.

The attitude of today's players has evolved to be highly critical of a green that is not up to the standards of the PGA tournament they saw this past weekend on T.V. Also, the job of maintaining the greens to a higher standard is complicated by the fact that, in many localities, golf is played year round. Because of this high volume of play, various practices have been resorted to for maintaining the turf in the condition required to keep players coming back to an individual course. One of these practices is the use of an alternate green, which is used while the permanent green is reconditioned or improved. This alternative involves the additional expense of preparation and maintenance of the alternative green as well as providing the player with an inferior putting surface.

A more common maintenance practice is that of piercing the surface of the green with closely spaced fine spikes. This aerates the greens and does not impair the playing surface. This method uses a roller with spikes to puncture the ground creating small wholes to create aeration of the green. The scarifying process is conducted by utilizing a roller with flat blades that slice small lines in the surface of the green creating some measure of cultivation. These methods of cultivation only affect the surface of the area which has been pierced or disked and has some negative impact on the quality of play and provides only minor cultivation benefits.

A less common but more effective procedure involves removing the sod from the green, conditioning the exposed ground and then replacing the sod. Although this is a more effective than the aforementioned scarifying procedures, the expense is considerable and the green is decommissioned for a considerable period of time. Because of these consequences, considerable revenues are spent and lost in the lack of playing time.

Proper maintenance also currently requires the frequent application of fertilizers. Current practice calls for the surface spraying of these chemicals onto the greens where the surface water and the solution are relied upon to transfer to fertilize down to the root base of the grass. Not only are many members of the playing public uncomfortable being exposed to these chemicals, but, frequently the fertilizers are flooded off the greens by unexpected heavy rains and winds. Not only is a lot of the fertilizer wasted but the damage from the runoff can cause to the surrounding habitat represents a considerable liability. These concerns have given rise to the practice of applying the fertilizers as a step in the scarifying process in an attempt to introduce the fertilizers below the ground closer to the root level. By doing so, the fertilizer should be more effective and the risk of runoff should be reduced. Although some benefits are achieved with this procedure, the application is still basically a surface one and the aforementioned problems still remain. The present invention is an improvement on U.S. Pat. No. 2,262,546 which is included herein by reference thereto.

It is the objective of the present invention to provide an apparatus for the cultivating and fertilizing of turf, such as golf greens, tee boxes and football fields. This invention demonstrates a practical means of effectively cultivating and fertilizing the soil below the turf in a manner so as to not disturb or disrupt the surface of the turf being treated.

It is also contemplated that this invention will pulverize the soil below the turf permitting better retention and placement of fertilizers and pesticides within the soil and producing the desired amount of ventilation to allow the roots room for growth and development.

SUMMARY OF THE INVENTION

It is the intent of this invention to provide a means of turf cultivation to various types of grass and soil used on golf courses and football fields. By using this invention, attached to a rolling frame, the blade will break up the compacted soil beneath the greens and inject fertilizer at the level of the existing root system. This invention can adjust the depth of the remediation between four to eight inches below the grass surface. This will allow aeration along with fertilization of the soil, improve drainage of the greens, and if needed, application of insecticide underground. This provides a safety net preventing runoff and contamination to surrounding water sources. It also limits insecticide exposure to the public while the greens are being cultivated.

All of the above actions occur while the invention is pulled behind a vehicle. Once the machine slices through the ground and the fertilizer is injected, the turf is rolled flat by the rear roller of the frame. After wetting the greens with a sprinkler system, the green is again rolled with a weighted roller to level any ridges that occurred during the turf cultivation. The playing surface can now be utilized within 48 to 72 hours after treatment.

BRIEF DESCRIPTION OF DRAWINGS

Other objects and advantages of the present invention will be apparent from a consideration of the following detailed description and drawings wherein.

DETAILED DESCRIPTION OF THE INVENTION

Figure 1:
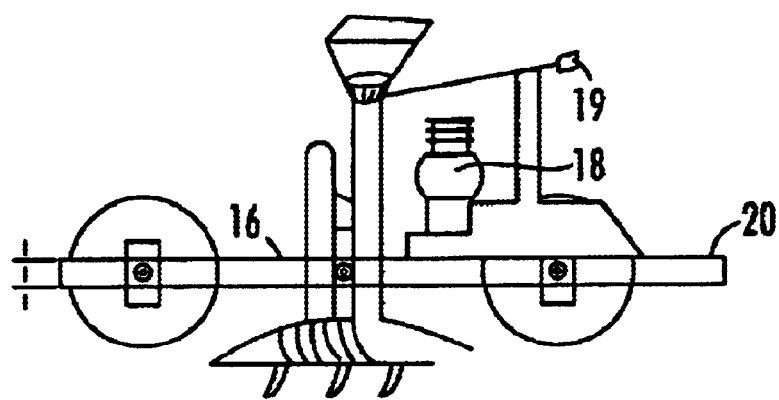
FIG. 1: This figure represents a cultivator blade that is attached to a rolling frame machine. A cross-sectional view of the working piece of equipment is shown in an operative position.
Figure 1:
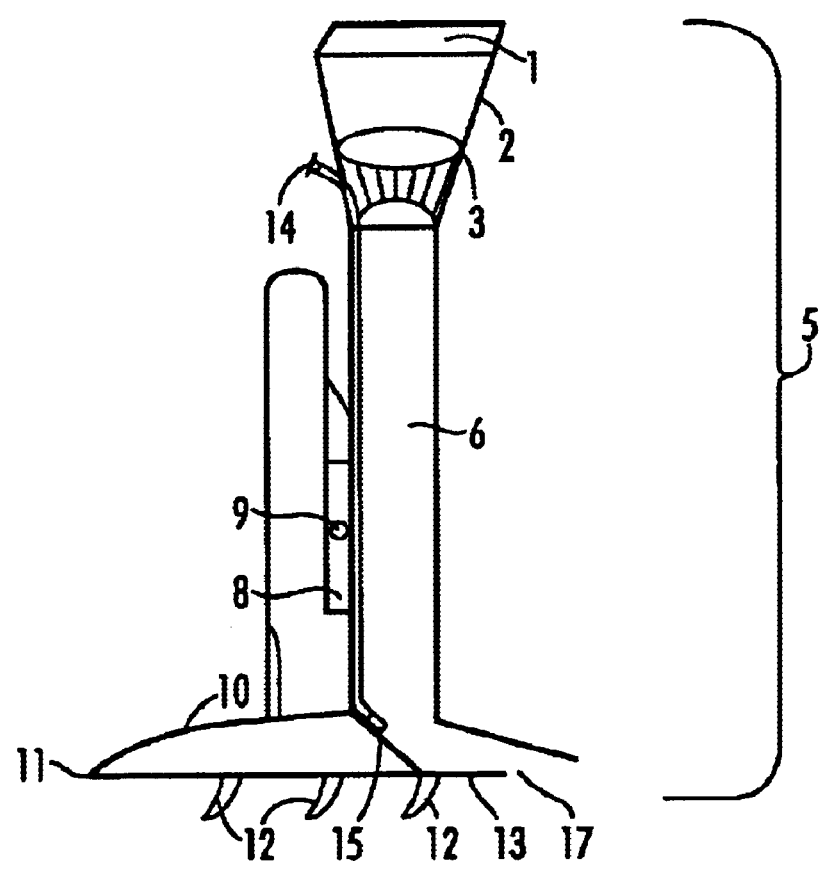
Figure 2:
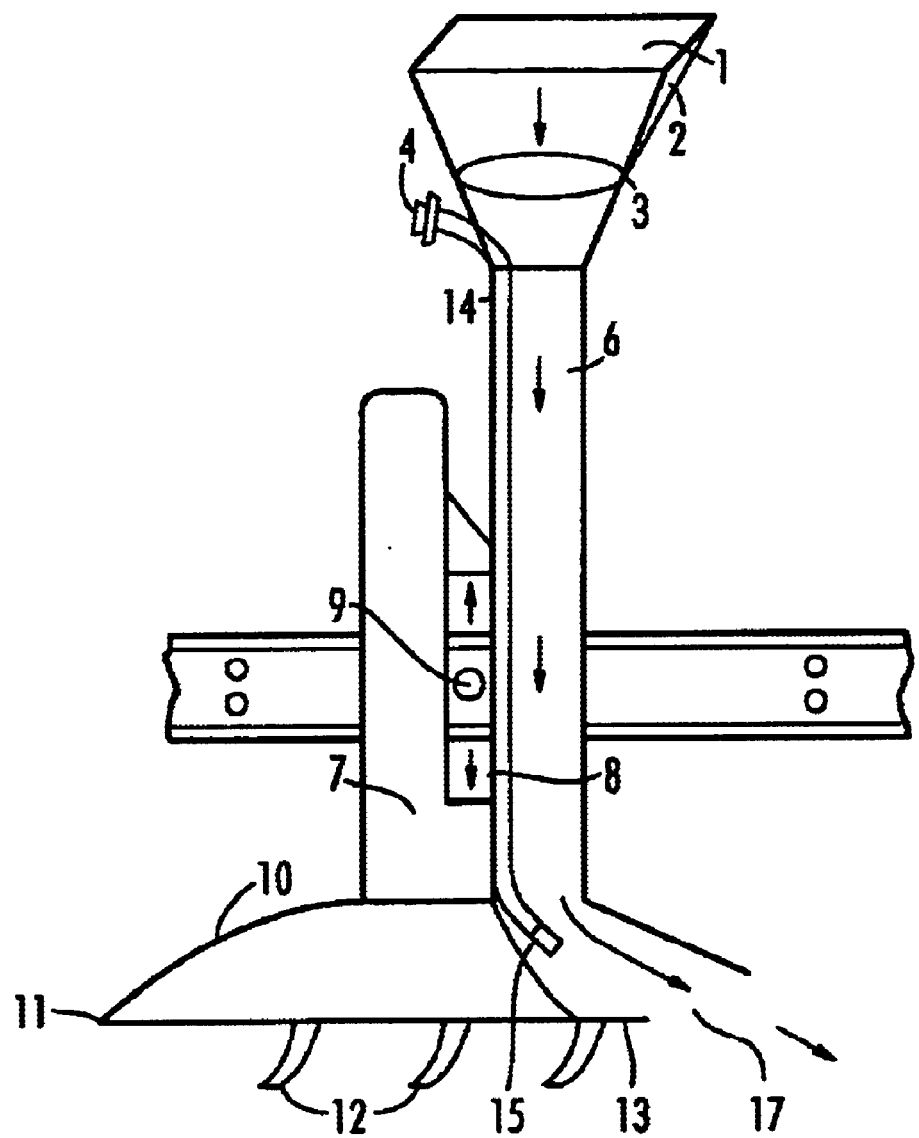
FIG. 2: This figure is a detailed view of the cultivator blade member of the machine showing the vertical adjustment range of the plow.

Reference to the drawing in detail, the numeral "1" is supported by a frame (16) on which the plow member is attached (9) and elevation adjustments (8) are made. The plow and fertilizer assembly (5) includes a hopper (1) having sloping lower walls in the form of a truncated cone. At the point where the lower wall (2) truncates, there is provided a screen eccentrically arranged opening of an adjustable orifice (3) through which granulated fertilizers or other soil treatment materials can be discharged. This is accomplished by utilizing a control arm (19) that is mounted at the handrail used by the operator riding on the rear of the machine (20).

Figure 3:
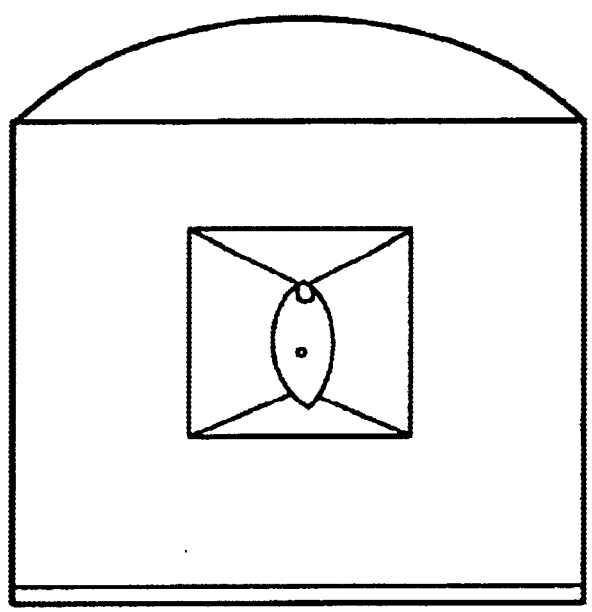
FIG. 3: This is a top view of the cultivator blade member.
Figure 4:
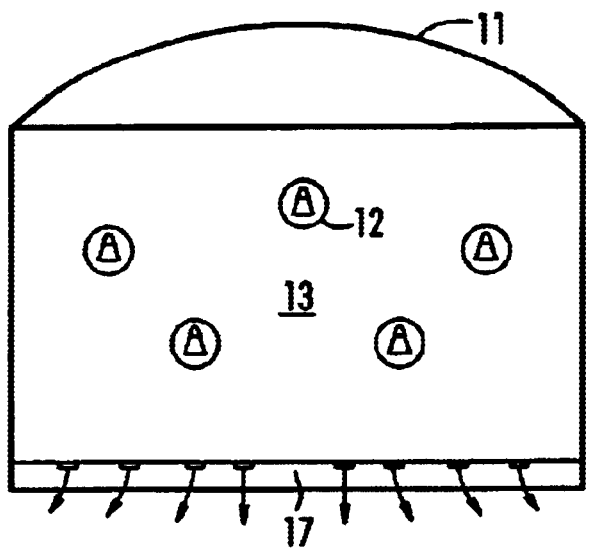
FIG. 4: This is a bottom view of the cultivator blade member showing the cultivating teeth and the fertilizer outlet vent (17).

The plow and fertilizer assembly (5) is also provided with a plow shank (7) and acts as a wedge in the turf and carries, on it's lower end, a space forming edge (11). The flat plate (10) is secured to a diverging plate (13) of generally rectangular configuration. Plate (10) is arranged at an angle to the plow shank with its rear end (17) elevated, whereas, plate (13), which is rigidly secured to the underside of the plate (10), is perpendicularly disposed with respect to the plow shank (7). Teeth (12) are secured to the underside of the plow and arranged laterally in an angular formation with the centermost tooth being the most advanced (FIG. 3). A tube (15) is provided, at its upper end, with an air pressure intake valve (4) conduit with air pressure outlet (14) distributing proper pressure to discharge fertilizer through the vent (17). This is attached to an air compressor that is mounted to the frame of the machine (18).

What is claimed is:

1. A turf cultivator comprising:
    a frame adapted for pulling behind a vehicle;
    a plow and fertilizer assembly attached to said frame wherein said plow and fertilizer assembly comprises:
    a forward projecting space forming edge capable of lifting sod;
    a plate capable of receiving said sod and further lifting said sod;
    a plow shank above said plate capable of splitting said sod;
    a diverging plate extending rearward from said space forming edge to a rear vent;
    a hopper capable of providing material to said rear vent wherein said material is distributed over a width of said rear vent.

2. The turf cultivator of claim 1 further comprising an air tube terminating at said rear vent capable of dispersing said material over said width of said rear vent.

3. The turf cultivator of claim 2 wherein said air tube traverses through said plow and fertilizer assembly.

4. The turf cultivator of claim 1 further comprising teeth attached to an underside of said plow and fertilizer assembly.

5. The turf cultivator of claim 1 further comprising at least one roller attached to said frame and rearward of said rear vent.

6. The turf cultivator of claim 1 further comprising a platform attached to said frame for a person to ride on said platform during operation.

7. A turf cultivator comprising:
    a frame adapted for pulling behind a vehicle comprising:
    a forward projecting space forming edge capable of lifting sod attached to said frame;
    a flat plate capable of receiving said sod and further lifting said sod;
    a plow shank above said plate capable of splitting said sod;
    a diverging plate extending rearward from said space forming edge to a rear vent;
    a hopper capable of providing material to said rear vent wherein said material is distributed over a width of said rear vent; and
    an air tube terminating at said rear vent capable of dispersing said material over said width of said rear vent.

8. The turf cultivator of claim 7 further comprising teeth attached to an underside of said plow and fertilizer assembly.

9. The turf cultivator of claim 7 wherein said air tube traverses through said plow and fertilizer assembly.

10. The turf cultivator of claim 6 further comprising at least one roller attached to said frame and rearward of said rear vent.

11. The turf cultivator of claim 7 further comprising a platform attached to said frame for a person to ride on said platform during operation.

* * * * *